US007228255B2

(12) United States Patent
Berthaud et al.

(10) Patent No.: US 7,228,255 B2
(45) Date of Patent: Jun. 5, 2007

(54) ADJUDICATION MEANS IN METHOD AND SYSTEM FOR MANAGING SERVICE LEVELS PROVIDED BY SERVICE PROVIDERS

(75) Inventors: Jean-Marc Berthaud, Villeneuve-Loubet (FR); Joel Dalsky, Streamwood, IL (US); Shih-Chung Fang, Schaumburg, IL (US); Lee Tsiao, Hoffman Estates, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/314,375

(22) Filed: Dec. 20, 2005

(65) Prior Publication Data

US 2006/0167870 A1   Jul. 27, 2006

(30) Foreign Application Priority Data

Dec. 22, 2004   (EP) .................................. 04300936

(51) Int. Cl.
*G06F 17/30* (2006.01)
(52) U.S. Cl. .................... 702/184; 705/1; 709/223; 709/227; 379/1.04; 370/252; 370/254
(58) Field of Classification Search ................ 702/184; 705/1–4, 21, 18; 379/93.12, 91.02, 1.04, 379/94; 709/223, 227, 218; 370/252, 401, 370/230, 400
See application file for complete search history.

(56) References Cited

U.S. PATENT DOCUMENTS 5,732,218 A * 3/1998 Bland et al. ................ 709/224
6,341,265 B1 * 1/2002 Provost et al. ................ 705/4

(Continued)

FOREIGN PATENT DOCUMENTS

CA   2 419 675 A1   9/2003

(Continued)

OTHER PUBLICATIONS

Buco, et al.; Utility computing SLA management based upon business objectives; IBM Systems Journal, (Online) vol. 43, No. 1; Mar. 2004; pp. 159-178; XP002362303; www.research.ibm.com/journal/sj/431/buco.pdf.

(Continued)

*Primary Examiner*—Michael Nghiem
*Assistant Examiner*—Hien Vo
(74) *Attorney, Agent, or Firm*—Schmeiser, Olsen & Watts; William H. Steinberg

(57) ABSTRACT

A method and system for managing a service level of a service provided by a service provider to a customer under a service level agreement. The measurement data is adjudicated to correct the measurement data in accordance with at least one adjudication element that identifies a rule specifying how to correct the measurement data. The adjudicated measurement data is transformed into operational data by merging the adjudicated measurement data using a logic specified in the service level agreement. The operational data is evaluated by applying a formula to the operational data, resulting in the operational data being configured for being subsequently qualified. The operational data is qualified by comparing the evaluated operational data with specified service level targets for at least one service level period and identifying operational data points meeting and/or not meeting the specified service level targets.

20 Claims, 3 Drawing Sheets

U.S. PATENT DOCUMENTS

| | | |
|---|---|---|
| 6,363,053 B1 | 3/2002 | Schuster et al. |
| 6,366,563 B1 | 4/2002 | Weldon et al. |
| 6,512,746 B1 | 1/2003 | Sand |
| 6,553,568 B1 | 4/2003 | Fijolek et al. |
| 2002/0077836 A1 | 6/2002 | Elnozahy et al. |
| 2002/0143920 A1 | 10/2002 | Dev et al. |
| 2002/0167936 A1 | 11/2002 | Goodman |
| 2003/0053455 A1 | 3/2003 | Kryskow, Jr. |
| 2003/0145080 A1 | 7/2003 | Breese et al. |
| 2003/0179703 A1 | 9/2003 | Levy et al. |
| 2003/0185212 A1 | 10/2003 | Kelly et al. |
| 2003/0187966 A1 | 10/2003 | Sinha |
| 2003/0198235 A1 | 10/2003 | Weldon et al. |
| 2006/0133296 A1* | 6/2006 | Berthaud et al. ........... 370/252 |
| 2006/0171509 A1* | 8/2006 | Berthaud et al. .......... 379/1.04 |

FOREIGN PATENT DOCUMENTS

| | | |
|---|---|---|
| EP | 1 229 685 A2 | 8/2002 |
| EP | 1 351 441 A2 | 10/2003 |
| GB | 2 349 715 A | 11/2000 |
| JP | 2001044994 A | 2/2001 |
| JP | 2001320370 A2 | 11/2001 |
| JP | 2002215408 A | 8/2002 |
| JP | 2003037630 A | 2/2003 |
| JP | 2003058653 A | 2/2003 |
| JP | 2003162591 A | 6/2003 |
| WO | WO 01/47190 A1 | 6/2001 |
| WO | WO 01/61524 A1 | 8/2001 |
| WO | WO 02/17065 A2 | 2/2002 |
| WO | WO 02/080459 A1 | 10/2002 |
| WO | WO 02/093894 A2 | 11/2002 |
| WO | WO 03/084133 A1 | 10/2003 |

OTHER PUBLICATIONS

Bhoj, et al.; SLA management in federated environments; Computer Networks, Elsevier Science Publishers B.V., Amsterdam, NL, vol. 35, No. 1; Jan. 2001; pp. 5-24; XP004304815; ISSN: 1389-1286.

* cited by examiner

ADJUDICATION MEANS IN METHOD AND SYSTEM FOR MANAGING SERVICE LEVELS PROVIDED BY SERVICE PROVIDERS

CROSS REFERENCES TO RELATED INVENTIONS

This invention is related to U.S. patent application Ser. No. 11/314,373 entitled "METHOD AND SYSTEM FOR MANAGING SERVICE LEVELS PROVIDED BY SERVICE PROVIDERS", filed on even date herewith, and U.S. patent application Ser. No. 11/314,301 entitled "QUALIFYING MEANS IN METHOD AND SYSTEM FOR MANAGING SERVICE LEVELS PROVIDED BY SERVICE PROVIDERS", filed on even date herewith.

BACKGROUND OF THE INVENTION

1. Technical Field

The invention relates to service management and service presentation systems, wherein measurement data regarding services delivered by Service Providers to customers are gathered and handled to compute and communicate service indicators defined in Service Level agreements and, in particular, relates to adjudication means for adjudicating any type of measurement data in a system managing the Service Levels provided by Service Providers.

2. Related Art

A Service Provider (SP) provides or manages resources for its customers. A resource can be a server, a particular application on a server, a networking device, people in a help desk to answer users, people to fix problems, people to manage and change systems configuration and location, . . . etc. . . . or a complex solution made of multiple elements to accomplish or support a customer business process. The Service Provider and the customer can be different firms, or different departments in a large global enterprise where departments are organized as support services for other departments, e.g. Marketing, Research, Sales, Production, . . . .

Normally, a Service Level Agreement (SLA) is signed between a provider and a customer to define the role of each party and to remove any ambiguity from the business relationship.

Such a SLA:

Identifies the parties involved in the agreement.

Describes the service to be provided, and identifies in a measurable and quantifiable manner indicators of the quality of the service on which obligations will be set, with a possible series of exceptions and stipulations in the way to calculate these indicators.

Defines the obligations, called Service Levels (SLs), to be met on the identified indicators, so that the expected quality of the delivered services is set in an un-ambiguous manner.

Defines the agreement period for which these obligations are set forward.

Pre-defines penalties to be paid/executed by the SP if the commitment(s) is (are) not met. If a commitment is exceeded, a reward can also be predefined, to be paid by the customer.

Also defines reporting policies, corrective actions, dispute resolution procedures, termination criteria, intellectual property . . . .

A SLA is encountered when considering utilities to be trusted "always-on" services such as providing water, electricity, gas, telephone, e-service (e.g., e-Business On Demand), etc. In fact, a SLA exists when a specific service offer including commitments is engaged with a customer.

By itself, a SLA does not bring any change in the level of service delivered. The Service Provider and/or the customer need to implement a Service Level Management (SLM) program that will actually result in higher levels of services. Indeed, a SLA only specifies the agreed criteria for determining whether or not a set of agreed service quality levels are met. When not met, the issue is to determine what caused the violation, maybe how to improve the service, or change the SLA or the provider. The Service Level Management begins with the development of new service levels for a new contract and continues throughout the life of the contract to ensure Service Level commitments are met and maintained.

The Service Level Management is commonly identified as the activities of:

negotiating, identifying and agreeing the measurable services that support the Business Process of a customer, and defining the SLA articulation in an offering for service with Service Level Objectives (SLO) also known as Service Level Targets (SLT), monitoring resources used to deliver a service and capturing data on how well these resources perform from monitors or from logs, calculating intermediate and high level Service Levels results or scores using the predefined service parameters formulae (called metrics) and taking into account all kinds of exceptions that can occur, assessing attainment versus commitments and possible penalties or rewards, assessing impact of operational outages or degradations in terms of SLAs (services) and financial impacts, alerting in real-time of possible or effected outages, diagnosing problems for resolution, enforcing corrective actions wherever possible to regulate the delivery system and therefore try to proactively guarantee the achievement of obligations, reporting to the provider and the customer on real numbers versus contractual numbers, and sealing final numbers to be used for rebates or rewards, rebating to customers when commitments are not achieved, or rewarding the provider when commitments are exceeded, and refining, improving and reviewing SLA definitions, Service Levels and services that support the customer's Business Process.

Today, there are SLA Management Systems which are automated for managing SLAs such as IBM Tivoli Service Level Advisor, Computer Associates SLM, Digital Fuel or InfoVista. They are built to accomplish, at least, a minimum set of tasks such as capturing data from monitoring systems, and they participate or supply information to other service management activities such as alerting, enforcing or reporting.

Some of these systems are sufficiently elaborated to solve the problem of accounting for such situations where an SLA is violated due to Customer's responsibility. In such cases, the result must be revised to reflect the true responsibility of the Service Provider after calculation by these systems. Indeed, very often a piece of the solution used to support the customer business process which is managed by the Service Provider is coming from the customer, or is under the customer's responsibility (shared or not with the Service Provider). This activity will be called Adjudication in the following, and the information input to this activity will be called Adjudication Elements.

However, these systems either enable adjudication through direct modification of data, or employ means specific to each case of adjudication. In the first case, this does not allow to define the adjudication to be applied before all the data to be adjudicated are in the system. The second case corresponds to numerous specific cases depending on the types of data and the situations. Standard ways of doing these cases use adjudication elements specifying modifications for each data points, which can be quite heavy to manage and to use with data feeds like periodical response time measurements containing numerous data points in a SL period (i.e., business period). Or they involve code and data structures specific to each measurement domain and adjudication situation and this creates a significant code maintenance problem and a development bottleneck when new domains or situations arise.

Therefore, there is a need for a universal method describing adjudications in order to avoid complex development and information management in those systems, and to allow a quick and efficient creation of modifications for a large amount of data. And yet, this method must allow more optimal and less generic ways of describing and processing adjudication elements to co-exist and to be developed in parallel, and also to be used for specific cases when they are more appropriate.

SUMMARY OF THE INVENTION

The present invention provides a method for managing at least one service level of a service provided by a service provider to a customer of the service provider under a service level agreement, said service level agreement being a contract between the service provider and the customer, said method comprising:

adjudicating measurement data to correct the measurement data in accordance with at least one adjudication element, each adjudication element identifying a rule specifying how to correct the measurement data;

transforming the adjudicated measurement data into operational data by merging the adjudicated measurement data using a logic specified in the service level agreement;

evaluating the operational data by applying a formula to the operational data, resulting in the operational data being configured for being subsequently qualified; and qualifying the operational data after said evaluating,.said qualifying comparing the evaluated operational data with specified service level targets for at least one service level period during which the service has been performed, said qualifying identifying from said comparing data points selected from the group consisting of good data points of the operational data meeting the specified service level targets, bad data points of the operational data not meeting the specified service level targets, and combinations thereof, wherein said adjudicating, transforming, evaluating, and qualifying are performed by software modules of an execution engine.

The present invention provides a system for managing at least one service level of a service provided by a service provider to a customer of the service provider under a service level agreement, said service level agreement being a contract between the service provider and the customer, said system comprising an execution engine for performing a method, said method comprising:

adjudicating measurement data to correct the measurement data in accordance with at least one adjudication element, each adjudication element identifying a rule specifying how to correct the measurement data;

transforming the adjudicated measurement data into operational data by merging the adjudicated measurement data using a logic specified in the service level agreement;

evaluating the operational data by applying a formula to the operational data, resulting in the operational data being configured for being subsequently qualified; and qualifying the operational data after said evaluating, said qualifying comparing the evaluated operational data with specified service level targets for at least one service level period during which the service has been performed, said qualifying identifying from said comparing data points selected from the group consisting of good data points of the operational data meeting the specified service level targets, bad data points of the operational data not meeting the specified service level targets, and combinations thereof, wherein said adjudicating, transforming, evaluating, and qualifying are performed by software modules of an execution engine.

DETAILED DESCRIPTION OF THE INVENTION

The present invention provides a method and system for managing the Service Levels provided by Service Providers to a customer, to provide adjudication means and to achieve a generic method for modifying input data (adjudication) taking into consideration external information elements related to input data (adjudication elements) using a generic format to hold information such as the Service Level Agreement (SLA) contract clauses, or such as input from the service manager or other enterprise management systems, to produce new modified input data for Service Level calculations.

The present invention relates to a system for managing a Service Level provided by a Service Provider to a customer comprising a processing engine for transforming measurement data into operational data using service time profiles and Service Level business logics, and evaluating the operational data in order to produce Service Level results and qualified operational data. Such a system comprises adjudication means for adjudicating the actual measurement data before transforming the adjudicated data into operational data wherein the adjudication is made by using a set of adjudication elements describing the modifications to bring, the adjudication means including a rule instance associated with each adjudication element, the rule instance comprising fields for identifying all the parameters of the Service Level being managed and a field containing a specific rule defining the command used to adjudicate the measurement data.

The specific rule is a time based rule relying on the fact that any monitoring data point used in a Service Level has a timestamp attached to it, since Service Levels are always periodical or time related and only data points pertaining to the corresponding period of time is considered during the evaluation.

A basic set of four commands (Exclude, Add, Modify and Include) which can be combined in a simple manner is sufficient to create any controlled modification to sets of measurement data within time ranges.

A system according to the invention comprises a repository of the description of the SLA corresponding to each Service Level, a first datastore for the measurement data, a second datastore for adjudication elements, a third datastore for SL results, operational data, adjudicated data and a processing engine for processing an evaluation cycle for each Service Level (SL).

Figure 1:
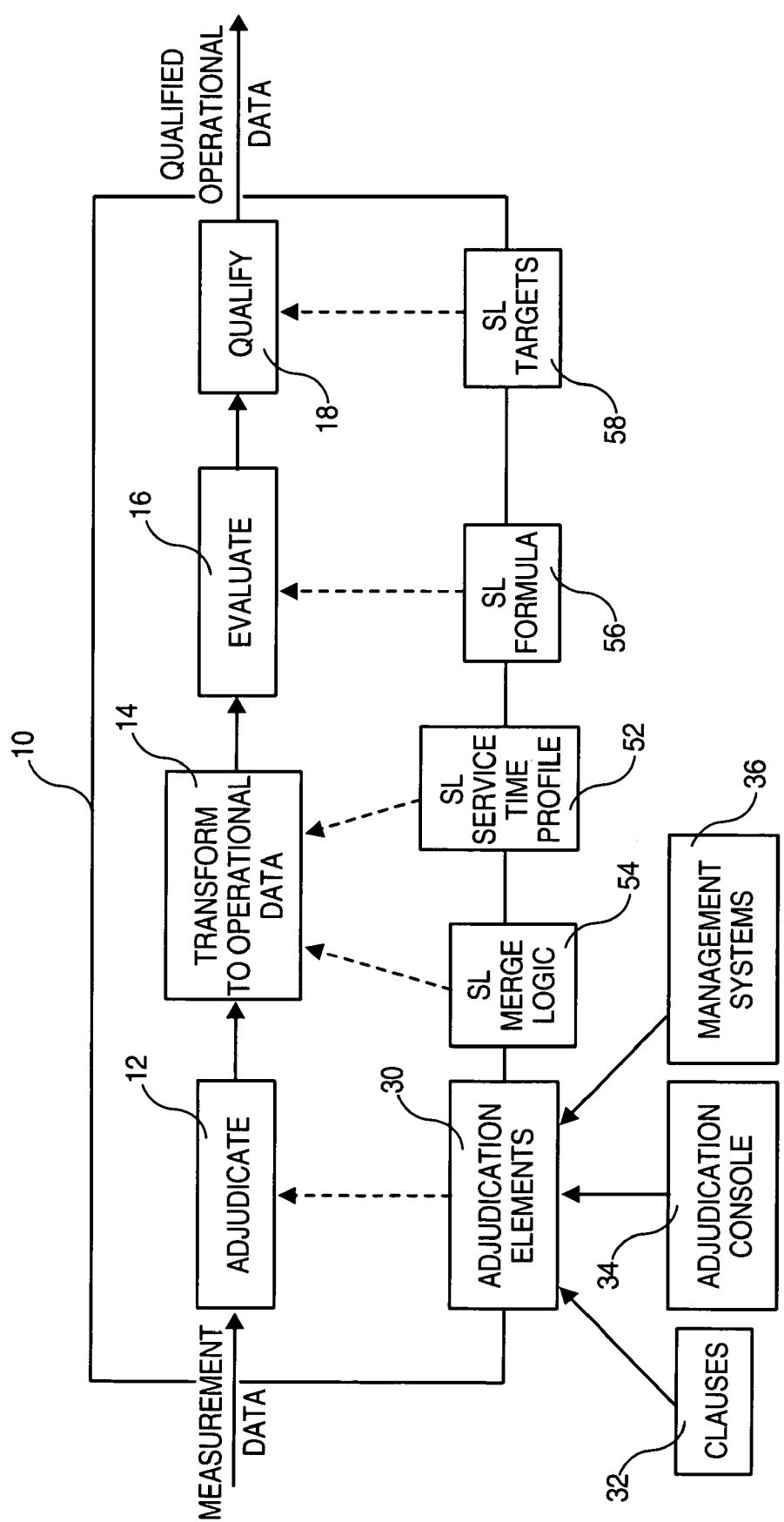
FIG. 1 is a schematic block-diagram representing the process engine used in the invention and the sequence of steps implemented therein.
Figure 2:
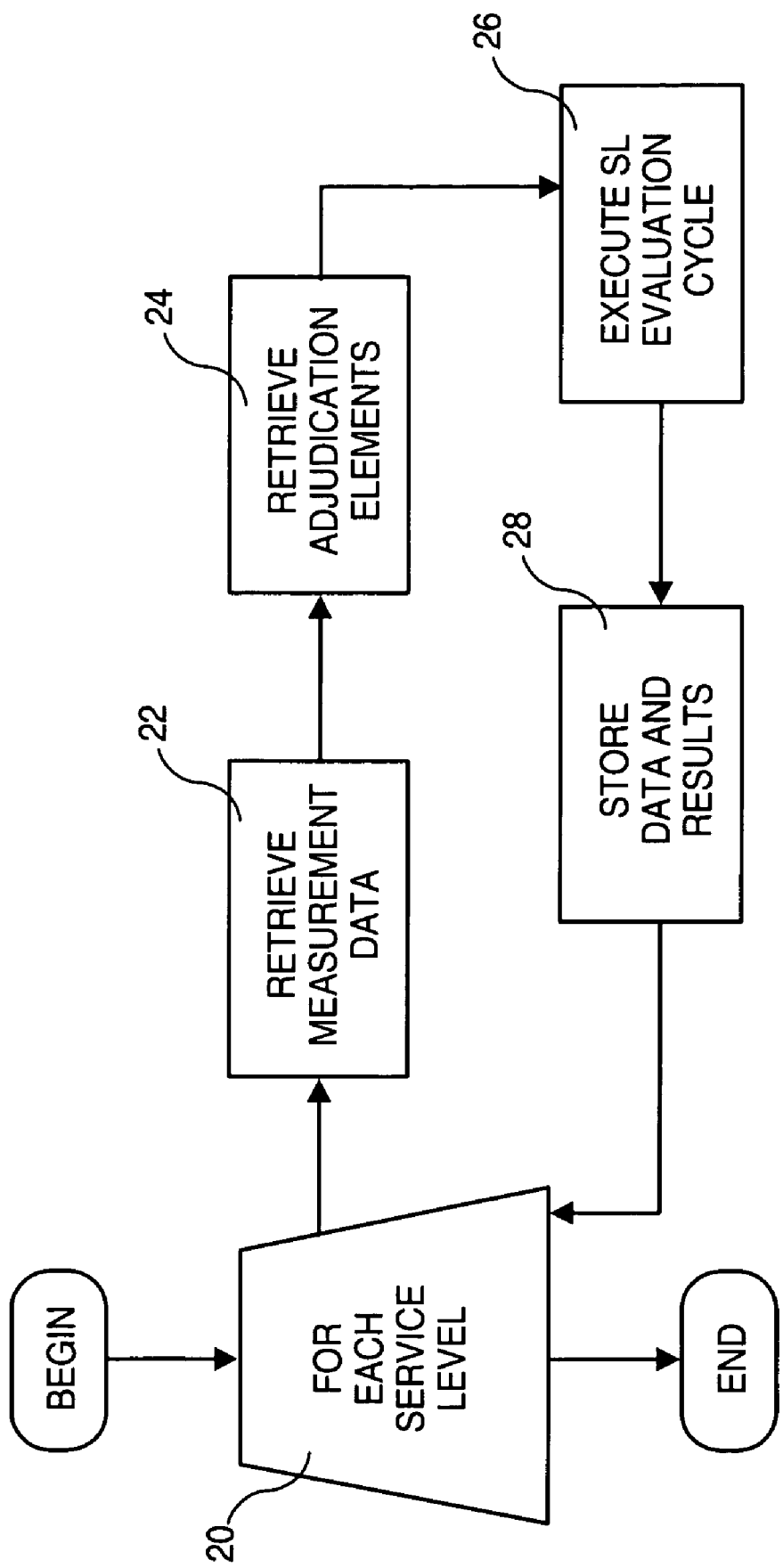
FIG. 2 is a schematic diagram illustrating the processing cycle implemented for each Service Level.

The processing engine 10, illustrated in FIG. 1, includes software modules of a computer system to process the measurement data received as input and to provide qualified operational data as output. As described hereafter, the process performed by the processing engine 10 comprises essentially four main steps: a step of adjudicating the input measurement data (step 12); a step of transforming the adjudicated data into operational data (step 14); a step of evaluating these operational data (step 16); and a step of qualifying the operational data (step 18). In other words, as illustrated in FIG. 2, the process is implemented for each Service Level (SL) 20. First, the measurement data for the service level is retrieved (step 22), such measurement data being related to the evaluated SL period. Then, all the adjudication elements related to the evaluated SL period are retrieved (step 24) from the second datastore for the adjudication elements and the SL evaluation cycle can be executed (step 26) as per SLA descriptions. Finally, the adjudicated data, the qualified operational data, and the SL results are stored (step 28) into the third datastore.

Returning to FIG. 1, the step of adjudicating 12 is used to correct the actual measurement data to reflect the real domain of responsibility of the Service Provider, or to reflect reality because, for some reason, the monitors provide incorrect data. A new set of adjudicated data is produced by this step. Although the actual measurement data are different from the adjudicated ones, reference data to the actual measurement data are still available to be used by other systems requiring the original observed data, or so that changes can be audited in support of legal purposes.

Adjudication elements 30 provide information relating to how to correct the measurement data. The adjudication elements 30 may be sourced from the contract clauses 32 created at contract signing time and are valid for the whole Service Level life (exclusion cases, special conditions, limits on resources, etc.). The adjudication elements 30 may also be created, from the adjudication console 34, at any time during the Service Level life by Service Managers when executing their Service Level Management tasks. Finally, the adjudication elements 30 may be created automatically from other Enterprise Management systems 36 like Problem and Change Management, using responsibility fields and other information. The adjudication elements 30 hold a reason for the modifications they bring, which will be shown to the end customer and must be agreed by the customer, and information about the creator who/which is first authenticated and goes through processes of authorization.

Each "modified" (i.e., adjudicated) data point contains a list of references to applied adjudication elements and clauses in their specific order of appliance, for auditing, detailed reporting/explanation, customer relationship, legal justification and later billing exploitation (rebate or reward). Each adjudication element 30 is persistently saved/locked into an unchangeable state as soon as it is used so that no more modification can happen to the locked adjudicated element, for guaranteeing that proper information is available for auditing controls.

This step also supports a parallel information management process whereby the adjudication can be sealed so that no more modification can be made to the Service Level result and other produced data for a given Service Level period, i.e. no more adjudication element can be created for this Service Level period. This corresponds to a process of finalization just before result data are sent to billing systems or used for other legal purposes, and after they have been reviewed and agreed with the customer.

Figure 3:
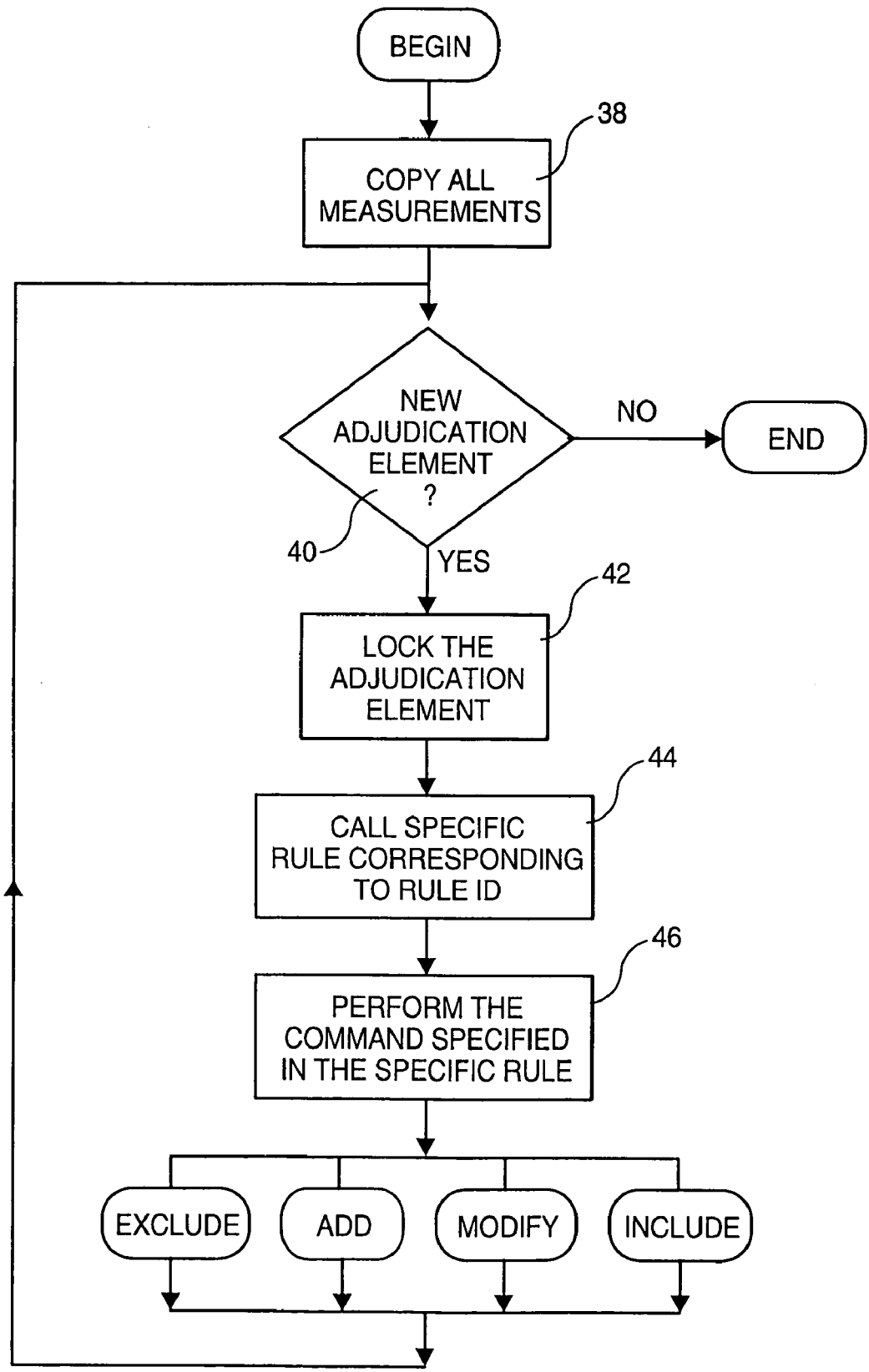
FIG. 3 is a flow chart of the steps implemented in the process of adjudicating the measurement data.

Each time an SL is requested to be evaluated, the process illustrated in FIG. 3 is executed. First, all measurements are copied as adjudicated measurements with an empty modification history chain (step 38), thus enabling to store a history of modifications for each measurement. Then, the process checks whether there is still an adjudication element to apply (step 40) to the set of adjudicated measurements. If it is the case, the adjudication element is locked as mentioned above (step 42). Then, a specific rule corresponding to a rule identification in the adjudication element is called (step 44) according to the principles of the invention.

Indeed, all adjudication elements, whether clauses or not, are expressed as rule instances, with the following fields:

Identification of the Service Level: an adjudication element is associated to a particular SL. For example, SLAContractId, OrderElementId, MetricId.

Identification of SL period(s) for which measurement data is to be modified (i.e., adjudicated): an adjudication element applies to defined Service Level period(s), identified through a start and end date corresponding to the start of a Service Level period, and to the end of a Service Level period. A clause is a particular case going from start of the first Service Level period to infinity (i.e. it is valid until the end of times or until the Service Level end of life).

Identification of the data feed to be modified (a data feed is a group of data points representing a particular metrics); for example, a MeasurementType_Id, a ComponentTypeId and a Resource_Id or Component_Id field. Some of these specifications can be generic or empty, meaning that the adjudication rule applies to all the measurement data feeds in this Service Level and the given period, which match with the remaining specified parameters.

User ID, date: the authenticated and authorized identification of the source which has created this element, with the creation date.

Reason: a reason text for the adjudication (i.e., the reason for the correction of the measurement data pertaining to the adjudication element).

Rule ID: applies the internally coded rule to the subset of data identified above. It is used as an index to code to execute in a function table. One of them is the specific rule.

Specific rule data to determine an instance of the rule, said instance to be applied to the measurement data to be adjudicated.

The specific rule instance allows creation of elements to address any case:

Identification of ranges of data to modify in the selected data feeds, and of a time interval (a Start Time and an End Time) within the selected SL period(s) to apply the following modification command to the corresponding data.

Modification Command to apply: further explained below.

Then, the modification command specified in the specific rule is performed (step 46) and, after completion, the process is looped back to the step of determining whether there is a new adjudication element to be processed (step 40). Sequences of adjudication elements with different Modification Commands must allow to apply any business logic/reason to modify data in relation to Service Level calculations in a generic and efficient manner. It was determined that the following set of operations with their associated process is sufficient to achieve any adjudication.

Exclude This command excludes data point(s) from subsequent qualification calculations but keeps the excluded data point(s) in output adjudicated and operational data with a flag indicating the excluded data point(s) were excluded, so that anybody can control or still know about the excludes data point(s). Furthermore, this command modifies time boundaries of data points overlapping with time range so that they do not overlap anymore.

Add This command adds data point(s): when it is determined that, for any reason, some data were missed (i.e., was absent) in the measurements described in the adjudication elements, this is the way to add the missing data. It is also a way to introduce data for non monitored metrics used in Service Levels (i.e. those for which there is no automatic data collection). This is followed by a set of value pairs (separated by ',') to set data point fields.

Modify This command modifies all data point(s) whose start time within the service level period of the measurement data is in the time range of the adjudication element for the measurements which are in the adjudication element description. It is followed by a set of value pairs (separated by ',') to replace current values in the specified portion of data feed by new values.

Include This command is used to cancel the effect of exclusions or modifications to data points. It resets data points to their original values and sets them to be included into SL calculations. Note that the way to cancel the effect of 'Add' adjudication elements is simply to create new 'Exclude' elements excluding the data points they have inserted.

An example of a response time Service Level on a URL would be: "Ignore the response times between <start date> and <end date>, because it is due to an incorrect manipulation by the customer on the server through its backend administration access".

Implementation specifics:

For 'Modify' and 'Add' adjudication elements, typical value pairs can be:

date=yyyy.MM.dd hh:mm:ss:SSS z, with SSS in milliseconds and z=timezone code.
min=value, with value=a double float constant.
max=value, with value=a double float constant.
avg=value, with value=a double float constant.
tot=value, with value=a double float constant.
smplcnt=value, with value=an integer constant.
errcnt=value, with value=an integer constant.
state=value, with value=a string without a ',' in it (no escape sequence).

Note that the adjudication system is cumulative: once an adjudication element has been created and has been used in an evaluation (i.e., applied to the measurement data), it cannot be removed (i.e., cannot be cancelled). New adjudication elements must be added to cancel its effects. Each Service Level process run goes through the full set of adjudication elements associated to the Service Level for the evaluated period, in the order they were created.

Returning to FIG. 1, the second step performed by the processing engine 10 is to transform (14) the adjudicated data into operational data by using a service time profile 52 describing the Service Level time logic (also commonly referred to as a service calendar and defining different periods of service with possibly different SLT's), and the specific business logic defined in the Service Level to modify raw data into a more appropriate form for evaluating and producing summary Service Level results.

In addition, each produced operational data point refers back to the original adjudicated measurement data point(s) it comes from, for tracing and auditing purposes. For example, a Service Level time logic can contain critical periods and off-peak hours in a month where different targets are to be achieved, or periods of no service. Monitoring devices and data collection systems have no knowledge of this information which is contract specific, and measurement data points can cover multiple such periods. Appropriate sets of data points need to be produced for generation of Service Level results and comparison with different Service Level targets. And to continue the example, if measurements are coming from different probes monitoring the same resource, they need to be merged by using a logic 54 specified in the Service Level Agreement before they can be used for Service Level calculations when evaluating and producing summary Service Level results.

Then, the operational data is evaluated (16) through a Service Level evaluation using a formula 56, specifying which data are to be fed as input, what is the form of data (response time, availability, counts, states), and how the input data should be processed to produce summary intermediate and top Service Level results. There is one set of data produced per business period in the Service Time Profile. The data produced by this step are to be used directly for Service Level attainment comparison, for reporting on Service Levels, and for input to other Enterprise Management systems. It matches what is contractually committed by the provider and represents a negotiated value and quality of the delivered service. The operational data resulting from the evaluation step 16 are configured for being qualified.

The operational data resulting from adjudicated data are qualified (step 18) with regards to their participation in achieving or not achieving results compared to Service Level targets 58 for each business period during which the service(s) provided by the Service Provider has been performed. The qualifying step identifies good operational data points with labels like "In Profile" (=contributes to good SL result) or bad operational data points with labels like "Out Of Profile" (=contributes to degrading SL result. Thus, the good and bad operational data points meet and do not meet, respectively, the specified service level targets. The qualifying step also determines deltas to breaking limit (i.e., differentials by which the identified data points differ from the specified service level targets). The deltas to breaking limit (i.e., differentials) are used to determine a margin by which the identified good and/or bad data points contribute to the high level SL results; i.e., contribute to meeting or not meeting the specified service level targets (for example: time remaining before "Out Of Profile" or violation, for problem resolution times, etc.). The deltas to breaking limit (i.e., differentials) and the margin may be stored in the third datastore.

What is claimed is:

1. A method for managing at least one service level of a service provided by a service provider to a customer of the service provider under a service level agreement, said service level agreement being a contract between the service provider and the customer, said method comprising:

adjudicating measurement data to correct the measurement data in accordance with at least one adjudication element, each adjudication element identifying a rule specifying how to correct the measurement data;

transforming the adjudicated measurement data into operational data by merging the adjudicated measurement data using a logic specified in the service level agreement;

evaluating the operational data by applying a formula to the operational data, resulting in the operational data being configured for being subsequently qualified;

qualifying the operational data after said evaluating, said qualifying comparing the evaluated operational data with specified service level targets for at least one service level period during which the service has been performed, said qualifying identifying from said comparing data points selected from the group consisting of good data points of the operational data meeting the specified service level targets, bad data points of the operational data not meeting the specified service level targets, and combinations thereof, wherein said adjudicating, transforming, evaluating, and qualifying are performed by software modules of an execution engine; and outputting the qualified operational data.

2. The method of claim 1, wherein each adjudication element identifies a particular service level of the at least one service level.

3. The method of claim 1, wherein each adjudication element identifies one or more service level periods of the at least one service level period, and wherein data of the measurement data is to be adjudicated in conjunction with said each adjudication element for said one or more service level periods.

4. The method of claim 3, wherein each adjudication element identifies a data feed of the data of the measurement data to be adjudicated in conjunction with said each adjudication element.

5. The method of claim 1, wherein each adjudication element identifies a source that created said each adjudication element and a creation date of said each adjudication element.

6. The method of claim 1, wherein each adjudication element comprises a reason for the correction of the measurement data pertaining to said each adjudication element.

7. The method of claim 1, wherein each adjudication element comprises an index to code that executes the rule identified in said each adjudication element.

8. The method of claim 1, wherein each adjudication element of the at least one adjudication element comprises specific rule data to determine an rule instance of the rule, and wherein the rule instance is to be applied to the measurement data to be corrected in conjunction with said each adjudication element of the at least one adjudication element.

9. The method of claim 8, wherein the determined rule instances comprise at least one modification command selected from the group consisting of an Exclude command, an Add command, a Modify command, an Include command, and combinations thereof:

wherein the Exclude command excludes at least one data point of the operational data from being qualified by said qualifying but retains the excluded at least one data point in the adjudicated and operational data with a flag indicating that the excluded at least one data point has been so excluded, wherein the Add command adds at least one more data point to the operational data if it had been determined that the at least one more data point was absent in the adjudicated measurement data, wherein the Modify command modifies all data points whose start time within the at least one service level period is in a time range for measurements of the measurement data which are in a description of an adjudication element of the at least one adjudication element, and wherein the Include command cancels an exclusion or modification of a first data point wherein said exclusion or modification had resulted from application of the Exclude or Modify command, respectively, to said first data point.

10. The method of claim 1, wherein an application of an adjudication element of the at least one adjudication element to the measurement data cannot be cancelled.

11. A system for managing at least one service level of a service provided by a service provider to a customer of the service provider under a service level agreement, said service level agreement being a contract between the service provider and the customer, said system comprising an execution engine for performing a method, said method comprising:

adjudicating measurement data to correct the measurement data in accordance with at least one adjudication element, each adjudication element identifying a rule specifying how to correct the measurement data;

transforming the adjudicated measurement data into operational data by merging the adjudicated measurement data using a logic specified in the service level agreement;

evaluating the operational data by applying a formula to the operational data, resulting in the operational data being configured for being subsequently qualified;

qualifying the operational data after said evaluating, said qualifying comparing the evaluated operational data with specified service level targets for at least one service level period during which the service has been performed, said qualifying identifying from said comparing data points selected from the group consisting of good data points of the operational data meeting the specified service level targets, bad data points of the operational data not meeting the specified service level targets, and combinations thereof, wherein said adjudicating, transforming, evaluating, and qualifying are performed by software modules of an execution engine; and outputting the qualified operational data.

12. The system of claim 11, wherein each adjudication element identifies a particular service level of the at least one service level.

13. The system of claim 11, wherein each adjudication element identifies one or more service level periods of the at least one service level period, and wherein data of the measurement data is to be adjudicated in conjunction with said each adjudication element for said one or more service level periods.

14. The system of claim 13, wherein each adjudication element identifies a data feed of the data of the measurement data to be adjudicated in conjunction with said each adjudication element.

15. The system of claim 11, wherein each adjudication element identifies a source that created said each adjudication element and a creation date of said each adjudication element.

16. The system of claim 11, wherein each adjudication element comprises a reason for the correction of the measurement data pertaining to said each adjudication element.

17. The system of claim 11, wherein each adjudication element comprises an index to code that executes the rule identified in said each adjudication element.

18. The system of claim 11, wherein each adjudication element of the at least one adjudication element comprises specific rule data to determine an rule instance of the rule, and wherein the rule instance is to be applied to the measurement data to be corrected in conjunction with said each adjudication element of the at least one adjudication element.

19. The system of claim 18, wherein the determined rule instances comprise at least one modification command selected from the group consisting of an Exclude command, an Add command, a Modify command, an Include command, and combinations thereof:

wherein the Exclude command excludes at least one data point of the operational data from being qualified by said qualifying but retains the excluded at least one data point in the adjudicated and operational data with a flag indicating that the excluded at least one data point has been so excluded, wherein the Add command adds at least one more data point to the operational data if it had been determined that the at least one more data point was absent in the adjudicated measurement data, wherein the Modify command modifies all data points whose start time within the at least one service level period is in a time range for measurements of the measurement data which are in a description of an adjudication element of the at least one adjudication element, and wherein the Include command cancels an exclusion or modification of a first data point wherein said exclusion or modification had resulted from application of the Exclude or Modify command, respectively, to said first data point.

20. The system of claim 11, wherein an application of an adjudication element of the at least one adjudication element to the measurement data cannot be cancelled.

* * * * *